(12) United States Patent
Sewall et al.

(10) Patent No.: US 6,843,571 B2
(45) Date of Patent: Jan. 18, 2005

(54) METHODS OF MAKING A MASTER AND REPLICAS THEREOF

(75) Inventors: Nelson D. Sewall, Forest Lake, MN (US); Kenneth L. Smith, White Bear Lake, MN (US); David W. Meitz, St. Paul, MN (US); Madeleine B. Fleming, Lake Elmo, MN (US); John C. Nelson, The Sea Ranch, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/166,673

(22) Filed: Jun. 11, 2002

(65) Prior Publication Data

US 2003/0227682 A1 Dec. 11, 2003

(51) Int. Cl.$^7$ ............................................... G02B 5/124
(52) U.S. Cl. ........................ 359/530; 359/529; 359/546
(58) Field of Search ................................ 359/529–533, 359/546–548, 850, 857

(56) References Cited

U.S. PATENT DOCUMENTS

| | | |
|---|---|---|
| 835,648 A | 11/1906 | Straubel |
| 3,057,256 A | 10/1962 | Erban |
| 3,684,348 A | 8/1972 | Rowland |
| 3,689,346 A | 9/1972 | Rowland |
| 3,712,706 A | 1/1973 | Stamm |
| 4,025,159 A | 5/1977 | McGrath |
| 4,202,600 A | 5/1980 | Burke et al. |
| 4,243,618 A | 1/1981 | Van Arnam |
| 4,349,598 A | 9/1982 | White |
| 4,478,769 A | 10/1984 | Pricone et al. |
| 4,486,363 A | 12/1984 | Pricone et al. |
| 4,588,258 A | 5/1986 | Hoopman |
| 4,601,861 A | 7/1986 | Pricone et al. |
| 4,775,219 A | 10/1988 | Appeldorn et al. |
| 5,117,304 A | 5/1992 | Huang et al. |
| 5,122,902 A | 6/1992 | Benson |

(List continued on next page.)

FOREIGN PATENT DOCUMENTS

| | | |
|---|---|---|
| EP | 0 787 311 B1 | 5/1999 |
| EP | 1 174 735 | 1/2002 |
| JP | 08309851 | 11/1996 |
| WO | WO 89/06811 | 7/1989 |
| WO | WO 95/11464 | 4/1995 |
| WO | WO 99/15921 | 4/1999 |
| WO | WO 01/35128 | 5/2001 |

OTHER PUBLICATIONS

Eckhardt, *Simple Model of Corner Reflector Phenomena*, Jul. 1971, vol. 10, No. 7, Applied Optics, pp. 1559–1566.

*Primary Examiner*—Audrey Chang
*Assistant Examiner*—Denise S. Allen
(74) *Attorney, Agent, or Firm*—Carolyn A. Fischer

(57) ABSTRACT

The invention relates to methods of making a master and replicas thereof including tooling and retroreflective sheeting. The invention further relates to the corresponding master, tooling and in particular retroreflective sheeting. The method comprises forming V-shaped grooves in a substrate (e.g. metal plate) wherein the intersections of three grooves form cube-corner elements. The cube-corner elements are substantially the same size throughout the array. The master as well as corresponding tooling and sheeting preferably have an average groove spacing within the range of about 0.0005 inches (0.0127 mm) to about 0.007 inches (0.1778 mm) throughout the array and more preferably an average groove spacing of less than about 0.004 inches (0.1016 mm).

68 Claims, 2 Drawing Sheets

U.S. PATENT DOCUMENTS

| | | |
|---|---|---|
| 5,156,863 A | 10/1992 | Pricone et al. |
| 5,171,624 A | 12/1992 | Walter |
| 5,200,851 A | 4/1993 | Coderre et al. |
| 5,557,836 A | 9/1996 | Smith et al. |
| 5,565,151 A | 10/1996 | Nilsen |
| 5,624,731 A | 4/1997 | Desjardins |
| 5,657,162 A | 8/1997 | Nilsen et al. |
| 5,721,640 A | 2/1998 | Smith et al. |
| 5,743,981 A | 4/1998 | Lu |
| 5,840,406 A | 11/1998 | Nilsen |
| 6,021,559 A * | 2/2000 | Smith .......................... 29/557 |
| 6,036,322 A | 3/2000 | Nilsen et al. |
| 6,168,275 B1 | 1/2001 | Benson et al. |
| 6,206,525 B1 | 3/2001 | Rowland et al. |

METHODS OF MAKING A MASTER AND REPLICAS THEREOF

FIELD OF THE INVENTION

The invention relates to methods of making a master and replicas thereof including tooling and retroreflective sheeting. The invention further relates to the corresponding master, tooling and in particular retroreflective sheeting. The method comprises forming V-shaped grooves in a substrate (e.g. metal plate) wherein the intersections of three grooves form cube-corner elements. The cube-corner elements are substantially the same size throughout the array. The master as well as corresponding tooling and sheeting preferably has an average groove spacing within the range of about 0.0005 inches (0.0127 mm) to about 0.007 inches (0.1778 mm) throughout the array and more preferably an average groove spacing of less than about 0.004 inches (0.1016 mm).

BACKGROUND OF THE INVENTION

Retroreflective cube-corner sheeting is commonly employed for various decorative and safety purposes. Cube-corner sheeting is often preferred for such uses as traffic signs, pavement markings, vehicle markings and personal safety articles, in view of its high retroreflected brightness. Since its inception, various improvements have been made, such as described by the patent literature that relates to cube-corner retroreflective sheeting.

More recently for example, U.S. Pat. No. 6,206,525 teaches retroreflective sheeting for forming orientation free cones of reflected light encompassing a 0.5 degree angle of observation formed of small metal backed cube-corner prisms in an array in which the size of the prisms are in a range between 0.0005 inch to 0.003 inches on center. The array is formed by casting transparent plastic prisms in a mold formed by ruling three sets of grooves which intersect at an angle. The grooves are spaced apart in the range of 0.0005 inch to 0.003 inches on center. Before or after formation, the prisms are coated with a reflective material such as a metal. The main disadvantage of very small prisms is described as being that it is very difficult to rule an array of 0.002" on center prisms over a large area, as the ruling cutting diamond wears out. However, very small prisms are described as having advantages as well, including increased flexibility.

SUMMARY OF THE INVENTION

The present inventors have found that when very small cube-corner prisms are formed from a master having precisely positioned V-shaped intersecting grooves, retroreflective masters and retroreflective replicas thereof such as retroreflective sheeting can exhibit a moiré-like pattern. It is surmised that the occurrence of such moiré-like pattern is caused from optical interference between neighboring cubes (i.e. group of cubes wherein the incident light is coherent). The presence of this moiré-like pattern in the sheeting can detract from the appearance of retroreflective articles comprising such retroreflective sheeting and in particular can diminish the legibility of traffic signs comprising such sheeting.

The present inventors have discovered methods of making a master as well as the corresponding tooling and retroreflective sheeting that minimize and eliminate the occurrence of such moiré-like pattern.

In preferred embodiments, the method comprises forming three sets of V-shaped grooves in a substrate such that the intersections form an array of cube-corner elements. The grooves in each set have average groove spacings ranging from 0.0005 inches (0.0127 mm) to 0.0070 inches (0.1778 mm). The grooves are formed such that the groove position of at least every 10th groove in at least one set is varied from an adjacent parallel groove by a magnitude ranging from about 50 nm to about 1/10th of the average groove spacing.

Also disclosed are methods of making a master wherein the grooves in each set are formed with a groove position precision ranging from about +/−10 nm to about +/−500 nm for a distance of 10 consecutive grooves and at least every 10th groove in at least one of the three sets is varied from an adjacent parallel groove by a magnitude ranging from about 15 nm to about 1/10th of the average groove spacing.

Also disclosed are methods of making a master comprising cube corner elements wherein the elements have a lateral dimension in plan view ranging from 0.0005 inches (0.0127 mm) to 0.0070 inches (0.1778 mm) throughout the array and at least 10% of neighboring cubes are formed such the cubes are randomly shifted in phase by at least 1/10th of a wavelength of visible light. In preferred embodiments a higher percentage of neighboring cubes are shifted in phase and/or the magnitude of the shift in phase is greater.

The magnitude of groove position variation is typically less than 1/15th of the average groove spacing, preferably less than 1/20th, more preferably less than 1/50th, even more preferably less than 1/75th of the average groove spacing, and most preferably about 1/100th or less of the average groove spacing. When the minimum magnitude of groove position variation is at least 200 nm, the grooves are formed with a precision at least as precise as +/−100 nm, whereas for embodiments wherein the minimum magnitude of groove position variation is at least 400 nm, the groove precision is at least as precise as +/−200 nm. The frequency of groove position variation is typically at least every 7th groove, preferably at least every 5th groove, more preferably at least every 3rd groove, and most preferably each groove position is varied throughout the array.

A random or pseudo-random process is preferably used to generate the magnitude of groove position variation. The groove position is varied by altering the groove spacing and/or the groove depth. The cube-corner elements may be canted or uncanted. The groove angle precision is typically at least as precise as +/−2 arc minutes, preferably at least as precise as +/−1 arc minute, and more preferably at least as precise as +/−½ arc minute. For embodiments wherein the master is retroreflective, the master is substantially free of a moiré-like pattern.

Also disclosed are methods of making retroreflective sheeting comprising providing a tooling that would result in the occurrence of a moiré-like pattern and tiling one or more tooling such that each tile is less than about ¼ inch (6.35 mm) in at least one dimension.

Also disclosed are methods of making a tooling comprising providing any of such masters, electroplating the master forming a negative tooling, removing the tooling from the master, optionally electroplating the negative tooling forming a positive tooling, and optionally electroplating the positive or negative tooling forming a multigenerational tooling.

Also disclosed are methods of making a retroreflective sheeting comprising providing such toolings having a microprismatic surface, casting a fluid resin composition on the microprismatic face of the tooling, allowing the composition to harden forming a sheet, and removing the tooling. In an alternate embodiment, a retroreflective sheeting may be formed by providing the tooling having a microprismatic surface, providing a moldable substrate, and contacting the microprismatic surface of the tooling to the substrate such that a replica of the microprismatic surface is imparted on the substrate, and removing the tooling. The resin composition or moldable substrate is typically transparent, such as polycarbonate. The method may optionally further comprise applying a reflective coating to the hardened resin or moldable substrate replica.

In other aspects, the invention relates to retroreflective sheeting comprising a polymeric sheet having an array of cube-corner elements. The elements are formed from intersecting V-shaped grooves. The grooves preferably have an average groove spacing ranging from 0.0005 inches (0.0127 mm) to 0.007 inches (0.1778 mm) and the sheeting is substantially free of a moiré-like pattern. A continuous land layer preferably connects the elements.

DETAILED DESCRIPTION OF THE PREFERRED EMBODIMENTS

Figure 1:
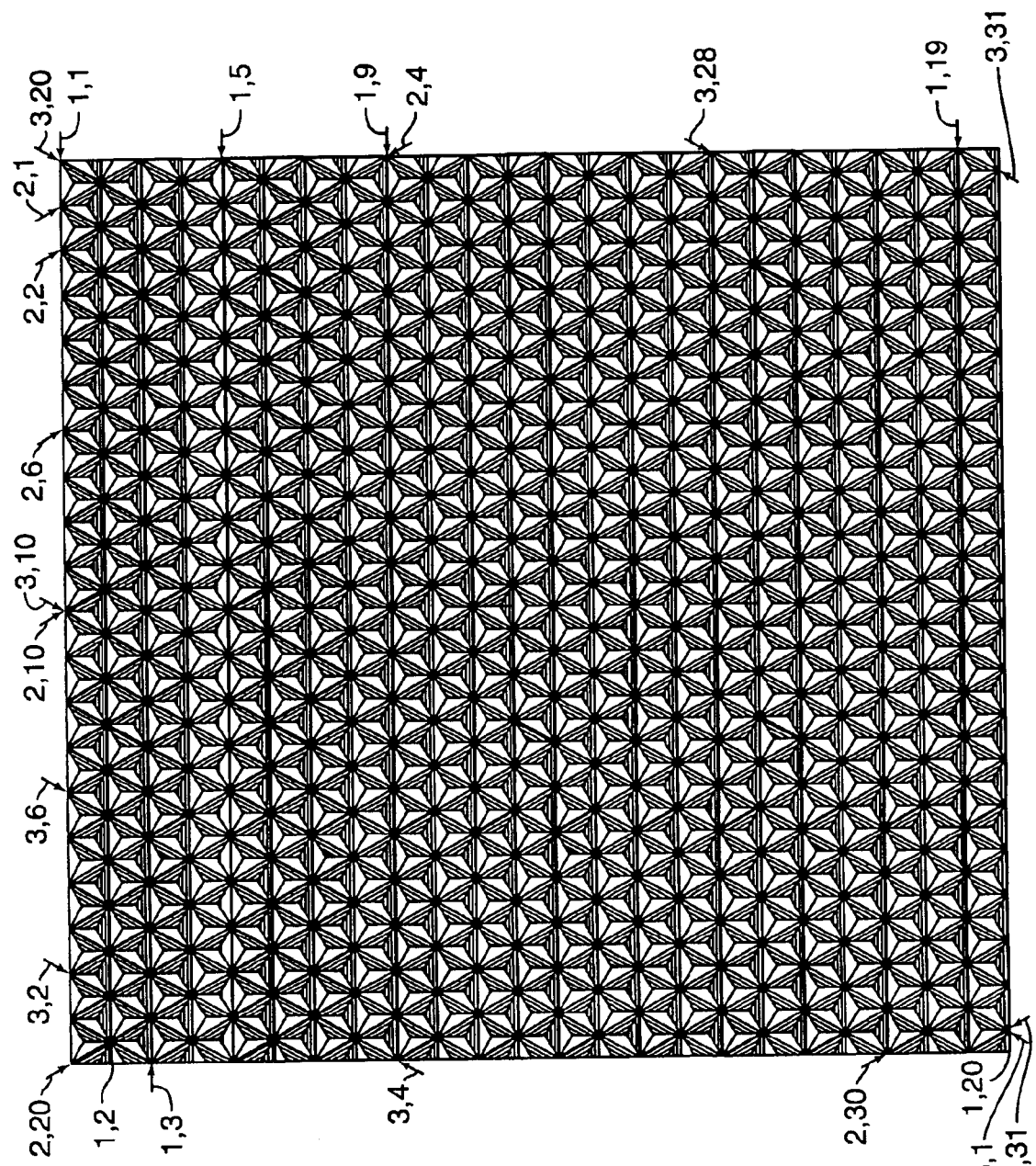
FIG. 1 depicts a magnified plan view of a portion of a master comprising three sets of V-shaped parallel grooves. An actual 6-inch-square (15.24-centimeter-square) master having a groove spacing of 0.004 inches (0.1016 mm) would have 1500 cube-corner elements along the width totaling over 2 million for the entire area. This figure also depicts a magnified plan view of a portion of retroreflective sheeting formed from a tool that was a negative replica of the master.

The present invention relates to methods of making a master and replicas thereof including tooling and retroreflective sheeting. The invention further relates to the corresponding master, tooling and in particular retroreflective sheeting. The occurrence of a moiré-like pattern in a retroreflective master, tooling or sheeting is substantially reduced, preferably minimized, and more preferably eliminated in the retroreflective sheeting. As used herein "substantially free of a moiré-like pattern" refers to an observation that is similar to that depicted in FIG. 3 in comparison to FIG. 2 when evaluated by shining the light from an ordinary flash light held near an observer's eyes at about the position of the nose at a distance from a retroreflective master or replica of up to about twenty feet, illuminating the retroreflective master or replica approximately normal to its plane.

The master is preferably manufactured with a groove-forming machine that employs a direct machining technique that comprises forming a pattern of grooves that mutually intersect to form cube-corner elements. The grooved substrate is referred to as a master from which a series of replicas may be formed. Examples of direct machining techniques include flycutting, milling, grinding and ruling such as described in U.S. Pat. Nos. 4,588,258 (Hoopman) and 3,712,706 (Stamm), which disclose single or multiple passes of a machine tool having two opposing cutting surfaces for cutting grooves to form cube-corner optical faces in a substrate.

Any substrate suitable for forming directly machined groove sets may be employed in the method of making the master of the invention. Suitable substrates should machine cleanly without burr formation, exhibit low ductility and low graininess and maintain dimensional accuracy after groove formation. A variety of machinable plastics or metals may be utilized. Suitable plastics comprise thermoplastic or thermoset materials such as acrylics or other materials. Machinable metals include aluminum, brass, electroless nickel alloys, and copper. Preferred metals include non-ferrous metals. Preferred machining materials are typically chosen to minimize wear of the cutting tool during formation of the grooves.

The diamond tools suitable for directly machining the groove sets are of high quality such as diamond tools that can be purchased from K&Y Diamond (Mooers, N.Y.) or Chardon Tool (Chardon, Ohio). In particular, suitable diamond tools are scratch free within 10 mils of the tip, as can be evaluated with a 2000× white light microscope. Typically, the tip of the diamond has a flat portion ranging in size from about 0.00003 inches (0.000762 mm) to about 0.00005 inches (0.001270 mm). Further, the surface finish of suitable diamond tools preferably have a roughness average of less than about 3 nm and a peak to valley roughness of less than about 10 nm. The surface finish can be evaluated by forming a test cut in a machinable substrate and evaluating the test cut with a micro-interferometer, such as can be purchased from Wyko (Tucson, Ariz.), a division of Veeco.

Although the method of making a master in accordance with the present invention is directed toward direct machining methods, the tooling and retroreflective sheeting could be derived from a master manufactured by other methods as well wherein the precise formation of retroreflective cube-corner elements would result in the occurrence of such moire-like pattern in the absence of the present invention. The resulting cube corner elements in plan view may have other shapes that are non-triangular including but not limited to trapezoids, rectangles, quadrilaterals, pentagons, or hexagons.

In the method of making the master of the invention, a plurality of V-shaped grooves are formed in a substrate (e.g. metal plate). As used herein, "cutting angle" refers to the relative orientation of the groove sets with respect to each other. "Groove spacing" refers to the distance (e.g. in the x-direction) between the nadir of a groove and the nadir of an adjacent parallel groove, the nadir being the lowest point of the groove. "Groove depth" refers to the distance (e.g. in the y-direction) between the top surface of the substrate (e.g. plate) and the nadir of the groove. "Groove position" refers to the two-dimensional position of the groove relative to the surface of the master (e.g. x, y coordinates). The third dimension of the groove (e.g. z-direction) is typically constant, extending from an outer edge of the master plate to an opposing outer edge. Accordingly, changing the groove spacing, the groove depth, or combination thereof can alter the groove position. "Groove half-angle" refers to the angle formed on either side of the V-shaped groove. The groove half angles are measured relative to a reference plane that is aligned with the cutting direction and normal to the plane of the substrate. The "groove angle" is the sum of adjacent half angles sharing the same nadir.

Typically, a first set of parallel grooves are formed in a plane, as depicted by grooves 1, 1 to 1, 20 of FIG. 1; a second set of parallel grooves are formed in the plane at a cutting angle relative to the first set, as depicted by grooves 2, 1 to 2, 31 of FIG. 1; and a third set of parallel grooves are formed in the plane at a cutting angle relative to the first set, as depicted by grooves 3, 1 to 3, 31 of FIG. 1. Each set comprises a plurality of adjacent parallel grooves. As used herein "adjacent parallel groove" refers to the groove on either side in the same set. For example, an adjacent parallel groove with respect to groove 1, 2 is groove 1, 1 or 1, 3.

Each groove within a set as well as each set of grooves is typically formed at a common depth. The cutting angle is typically about 60° and specifically chosen to be a specified angle within the range from about 45° to about 75°. The groove angles for each groove set intersection are chosen such that the dihedral angles are about 90°, forming cube-corner elements. In the case of uncanted cubes, the nominal groove angle is the same for all three sets. Alternatively, the cube-corner elements may be canted, the groove and cutting angles being chosen such that the optical axes of the elements are tilted. An example of forward canting is described in U.S. Pat. No. 4,588,258 (Hoopman). Further, the canted or uncanted cubes may be formed such that the groove angle is varied slightly (e.g. +/−10 arc minutes) to control the spread of retroreflected light. As depicted by FIG. 1, the three sets of intersecting grooves result in an array of cube-corner elements arranged in a uniform pattern. The array preferably has substantially the maximum number of elements per area of cube-corner elements.

The V-shaped grooves are formed with a diamond-tooling machine that is capable of forming each groove with fine precision. Moore Special Tool Company, Bridgeport, Conn.; Precitech, Keene, N.H.; and Aerotech Inc., Pittsburg, Pa., manufacture suitable machines for such purpose. Such machines typically include a laser interferometer-positioning device. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco. The precision (i.e. point to point positioning) of the groove spacing and groove depth is preferably at least as precise as +/−500 nm, more preferably at least as precise as +/−250 nm and most preferably at least as precise as +/−100 nm. The precision of the groove angle is at least as precise as +/−2 arc minutes (+/−0.033 degrees), more preferably at least as precise as +/−1 arc minute (+/−0.017 degrees), and most preferably at least at precise as +/−½ arc minute (+/−0.0083 degrees). Further, the resolution (i.e. ability of groove forming machine to detect current axis position) is typically at least about 10% of the precision. Hence, for a precision of +/−100 nm, the resolution is at least +/−10 nm. Over short distances (i.e. 10 adjacent parallel grooves), the precision is approximately equal to the resolution.

In order to consistently form a plurality of grooves of such fine accuracy over duration of time, the temperature of the process is maintained within +/−0.1° C. and preferably within +/−0.01° C. Further, to maintain groove angle tolerances, all the grooves in the master are preferably initially rough cut to a depth about 10 microns shallower than the final depth and then finish cut in alternating directions. As depicted in FIG. 1, the first groove 1, 1 (i.e. first set, first groove) is finish cut. The second groove is skipped and the third groove 1, 3 is finish cut in the same manner except in the opposite direction. The fourth groove was skipped and the fifth groove 1, 5 was finish cut in the first direction, etc. until the last groove at the bottom of the plate was formed. Then the alternating (i.e. skipped even numbered) grooves were finish cut from bottom to top in the same manner. The second and third groove sets are then cut in the same fashion.

The applicants have found that when small cubes are formed in a master with such precision, the retroreflective replicas thereof (i.e. tooling and sheeting) exhibit a moiré-like pattern. For instances wherein the master is made from a suitable substrate such that the master itself is retroreflective (e.g. transparent plastic), the master will also exhibit this moiré-like pattern. For embodiments wherein a tooling is formed from a master, the pattern is replicated during the manufacture of the tooling. Further, the pattern is then replicated again when retroreflective sheeting is formed from such tooling. Thus, for embodiments wherein a negative copy tool is employed to form a positive copy retroreflective sheeting, the surface of the retroreflective sheeting is substantially the same as the master from which it was derived.

Without intending to be bound by theory, it is surmised that the presence of such moiré-like pattern is an interference effect caused by coherence of incident light illuminating on and reflecting from neighboring cubes. The area over which the light is coherent defines the size of the neighborhood and is greater than the aperture size of the cubes. The aggregate of cubes that define that neighborhood all affect the incoming light identically. Neighboring cubes have within some small fraction of a wavelength of visible light an identical, repeating geometry. The reflected electric field of the light is theorized to only differ by the position of the cubes, the sum of the fields from individual cubes giving rise to the observed moiré-like pattern.

For reasons not fully understood, the occurrence of this moiré-like pattern was not readily evident in larger cubes, having a groove spacing of 0.01 inches (0.254 mm) for example. Accordingly, the methods and articles of the present invention are primarily directed to relatively small cubes, having an average groove spacing (i.e. pitch) in the range of 0.0005 inches (0.0127 mm) to 0.007 inches (0.1778 mm). Further, it is surmised that the severity of the occurrence of this moiré-like pattern tends to increase as the pitch decreases. Thus, the invention is most useful for methods of making masters and corresponding articles wherein the average groove spacing is less than 0.004 inches (0.1016 mm), and preferably less than 0.0035 inches (0.0889 mm).

Regardless of the technique employed in making the retroreflective elements, the lateral dimension of the elements (i.e. size of the elements as measured between opposing sides or features) preferably ranges from 0.0005 inches (0.0127 mm) to 0.007 inches (0.1778 mm). The lateral dimension of the elements is preferably less than 0.004 inches (0.1016 mm) and more preferably less than 0.0035 inches (0.0889 mm).

The applicants have discovered that the occurrence of such pattern can be diminished or eliminated by introducing a certain magnitude and frequency of groove position variability into the method of making the master wherein the variability is intentional and controlled. In doing so, one can minimize or eliminate the moiré-like pattern without sacrificing the retroreflected brightness. Altering the groove spacing, the groove depth, or combination thereof can vary the groove positions.

In contrast to forming cube-corner elements having substantially different sizes, as described in U.S. Pat. No. 6,168,275 for example, in the present invention the variation is relatively small such that the cube-corner elements of the master, tooling and sheeting are substantially the same size throughout the array, meaning that the smallest cube is at least 85% and preferably at least 90% of the size in comparison to the largest cube. In another regard, the active aperture of each cube is substantially the same as a corresponding cube in comparable sheeting wherein the only substantial difference being that the comparable sheeting employs a constant groove position throughout the array. For example, whereas in a comparable sheeting the grooves would have a common depth and constant spacing throughout the array [e.g. 0.003500 inch (0.088900 mm)], the sheeting of the invention would have an average groove spacing of 0.003500 inch (0.088900 mm) with the actual groove spacing varying from the average by a magnitude in the range of +/−0.000035 inch (0.000889 mm). In the present invention, the active aperture of the varied cube corner element (e.g. cube formed by the intersection of grooves 1,2; 2, 20; and 3,2) has substantially the same active aperture as the same cube corner element formed by the same intersections of the comparable sheeting having groove positions wherein groove position is constant. The effective area (i.e. active aperture) for a single or individual cube corner element may be determined by, and is equal to, the topological intersection of the projection of the three cube corner surfaces on a plane normal to the refracted incident ray with the projection of the image surfaces of the third reflection on the same plane. One procedure for determining effective aperture is discussed for example by Eckhardt, Applied Optics, v. 10 n. 7, Jul. 1971, pp. 1559–1566. Straubel U.S. Pat. No. 835,648 also discusses the concept of effective area or aperture.

The magnitude of the groove position variation ranges from greater than the precision of the groove-forming machine (i.e. +/−the resolution) to about 1/10th of the average groove spacing of the groove set. Accordingly, the magnitude of purposeful variation described herein is greater than the variation present as a result of machining tolerances. Further, however, the variation is substantially smaller than the variation employed for forming cube-corner elements that are substantially different in size. The magnitude of variation is at least 15 nm, preferably at least 25 nm, more preferably at least 50 nm and more preferably at least 100 nm, to insure that the variation is sufficiently large to shift the reflected light out of phase to the extent that can be detected by the human eye. For less precise groove forming machines, the minimum magnitude of variation is typically at least about 200 nm and preferably at least about 400 nm. At variations of greater than 1/10th of the target average groove spacing, the cube-corner elements are no longer substantially the same in size and geometry. Further, the cube-corner elements on at least one side of the groove have a substantially reduced active aperture, which can cause diminished retroreflected brightness at certain angles, particularly when the groove position variation is present at a high frequency, such as in the case wherein all the groove spacings are randomly varied throughout the array. Typically, however, the magnitude of the groove position variation is less than about 1/15th of the groove spacing, preferably less than about 1/20th, more preferably less than about 1/50th, and even more preferably less than about 1/75th, and most preferably about 1/100th or less to effectively eliminate the occurrence of the moiré-like pattern, without significantly affecting the retroreflected brightness.

In order to obtain a perceptible reduction of the occurrence of the moiré-like pattern, at least every 10th groove in at least one of the three sets is varied to the magnitude just described, meaning that throughout the array there are no more than 9 consecutive parallel grooves in a groove set have identical depths (e.g. 0.001500 inches (0.0381)) and a constant groove spacing (e.g. 0.003200 inches (0.08128 mm))+/−the precision. For a further reduction, at least every 8th groove in at least one set, preferably at least every 7th groove in at least one set, and more preferably at least every 6th groove in at least one set is varied. For an appreciable reduction, however, at least every 5th groove in at least one set, preferably at least every 4th groove, and more preferably at least every 3rd groove spacing is varied. In order to obtain a substantial reduction, the variation is introduced at a frequency such that every other groove or every groove position is varied.

It is surmised that varying the groove position at the frequency just described in at least two sets is more preferred than introducing such variation in only a single groove set. Further, introducing such variation in all three sets is surmised most preferred. Accordingly, the present invention describes 1000 combinations of groove position variation frequencies.

Upon introducing sufficient variation, a significant portion of neighboring cubes are shifted in phase such that the portion affected no longer affects the incident light identically. Typically at least 10% of neighboring cubes are randomly shifted in phase in the medium in which the light travels. In instances where the light travels through the microprismatic substrate, the medium and microprismatic substrate are one in the same. For other constructions, where light is retroreflected from the microstructured surface of the substrate, the medium is the material adjacent to the microstructured surface. Preferably, the shifting is random since it is surmised that shifting neighboring cubes in phase in a regular pattern may give rise to a different optical interference pattern. The percentage of cubes that are shifted in phase is related to the frequency at which the groove position variation is introduced. Since higher frequencies of groove position variation is preferred to obtain a significant reduction in the occurrence of the moiré-like pattern, it is also preferred that at least 20%, more preferably at least 30%, even more preferably at least 40%, and even more preferably at least 50% of neighboring cubes are formed such that the cubes are shifted in phase. To eliminate the occurrence, it is preferred that at least 60%, more preferred that at least 70%, even more preferred that at least 80% and most preferred that 90% or greater of the neighboring cubes are shifted in phase.

Although the magnitude of variation can be introduced in a repeating pattern, it is preferred that the magnitude of the variation is generated with a random or pseudo-random process. Various computer software programs are available that are suitable for generating random numbers within a specified range such as computer software commercially available under the trade designation "Microsoft Excel 97 SR-2". The following general formula can be used to generate random numbers within a specific range of numbers:

$$RND*(UL-LL)+LL;$$

wherein RND is a random number between 0 and 1, UL is the upper limit of the range, and LL is the lower limit of the range. For example for a target constant groove spacing of 0.00320000 inches (0.081280 mm) the upper limit may be 0.000032 inches (0.00082 mm, i.e. 1/100th of the target groove spacing), and the lower limit is −0.000032 inches. Therefore, the formula can be written as RND*(0.000032-−0.000032)+−0.000032, or RND*(0.000064)−0.000032.

Typically, the grooves are formed with a diamond tool in the substrate such that the groove spacing, groove depth, and groove angle are uniform throughout each groove. Accordingly, the magnitude of the groove position variation is the same throughout the groove. Alternatively, however, the grooves may be scallop cut or cut irregularly, either randomly or in a repeating pattern such that the groove position may vary from cube to cube or vary along the boundaries of a single cube. Alternatively, preformed grooves of a master that result in retroreflective sheeting having such moiré-like pattern, may be altered to the magnitude and frequency just described. For example, the grooves may be recut such that the groove position is modified. Typically, however, this is less preferred in view of the additional machining involved.

Depending on the substrate into which the grooves were formed, the master itself may be useful as a retroreflective article such as in the case wherein grooves are formed in a suitable transparent plastic substrate. Typically, however, the master itself is not retroreflective such as in the case of employing a metal plate as the substrate. To form a master tool of suitable size for forming retroreflective sheeting, a plurality of toolings (also referred to as tiles) are formed by electroplating the grooved surface of the master to form negative copies, subsequently electroplating the negative copies to form positive copies, electroplating the positive copies to form a second generation negative copies, etc. Electroplating techniques are generally known, such as described in U.S. Pat. Nos. 4,478,769 and 5,156,863 to Pricone et al. Tiling such toolings together can then assemble a master tool of the desired size.

It is appreciated that the tiling process may also be suitable for introducing groove position variation at the interface between seamed tiles. Typically, however, tiles are relatively large in size such that groove position variation as a result of tiling is too infrequent to sufficiently diminish the occurrence of the moiré-like pattern. However, provided that the tiles are sufficiently small, less than about ¼" (0.635 cm), the moiré-like pattern could be diminished as a result of tiling as well. This approach is less preferred due to the additional manufacturing time needed for such "micro" tiling. Further, groove position variation as a result of tiling does not affect the occurrence of the moiré-like pattern within the tile (i.e. sub-array).

The retroreflective sheet is preferably manufactured as an integral material, i.e. wherein the cube-corner elements are interconnected in a continuous layer throughout the dimension of the mold, the individual elements and connections there between comprising the same material. The surface of the sheeting opposing the microprismatic surface is typically smooth and planar, also being referred to as the "land layer". This land layer typically has a thickness ranging from about 0.001 inches (25 microns) to about 0.006 inches (150 microns) and is preferably at least 0.002 inches (50 microns) to 0.003 inches (75 microns). Manufacture of such sheeting is typically achieved by casting a fluid resin composition onto the master tool and allowing the composition to harden to form a sheet.

Optionally, however, the grooved master(s) or positive copy(s) thereof can be used as an embossing tool to form retroreflective articles, such as described in JP 8-309851 and U.S. Pat. No. 4,601,861 (Pricone). Alternatively, the retroreflective sheeting can be manufactured as a layered product by casting the cube-corner elements against a preformed film as taught in PCT application No. WO 95/11464 and U.S. Pat. No. 3,684,348, or by laminating a preformed film to preformed cube-corner elements. In doing so the individual cube-corner elements are interconnected by the preformed film. Further, the elements and film are typically comprised of different materials.

Suitable resin compositions for the retroreflective sheeting of this invention are preferably transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. A specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

An adhesive layer also can be disposed behind the cube-corner elements or the seal film to enable the cube-corner retroreflective sheeting to be secured to a substrate. Suitable substrates include wood, aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The retroreflective sheeting is useful for a variety of uses such as traffic signs, pavement markings, vehicle markings and personal safety articles, in view of its high retroreflected brightness. The coefficient of retroreflection, $R_A$, as measured as recommended by CIE publication No. 54 at $-4°$ entrance, $0°$ orientation, $0.2°$ observation is typically at least about 100 candela per lux per square meter, preferably at least about 300 candela per lux per square meter, and more preferably at least about 800 candela per lux per square meter. The sheeting is advantageous, particularly in comparison to the cube-corner sheeting having relatively larger cubes in view of its ease in manufacturing.

Objects and advantages of the invention are further illustrated by the following examples, but the particular materials and amounts thereof recited in the examples, as well as other conditions and details, should not be construed to unduly limit the invention.

EXAMPLES

Comparative Example A

A master was prepared using a 9-inch (22.86 cm) diameter by about 1 inch thick block comprised of machinable metal. The block was machined to have a 4.75 inch (12.06 cm)

square portion raised by about 0.005 inches (0.127 mm). The block was positioned on a groove-forming machine having a groove space and groove depth precision (i.e. point-to-point positioning) at least as precise as +/−100 nm and a resolution (i.e. ability of the laser interferometer positioning device to detect current axis position) of at least +/−10 nm.

Several diamond tools, which can be purchased from K&Y Diamond (Mooers, N.Y.) or Chardon Tool (Chardon, Ohio), were inspected to insure that each tool was suitable. Each diamond tool was evaluated with a 2000× white light microscope to insure that within 10 mils (250 microns) of the diamond tip the surface was scratch free. The surface finish of each diamond tool was also inspected by forming a test cut in a machinable substrate and evaluating the test cut with a micro-interferometer obtained from Wyko under the trade designation "RST" to ensure that the roughness average was less than 3 nm and that the peak to valley roughness was less than 10 nm. The tip of the diamond had a flat portion ranging in size from 0.00003 inches (0.00076 mm) to 0.00005 inches (0.001270 mm). A suitable diamond tool was fixed on the groove-forming machine so that V-shaped grooves could be formed into the raised center portion of the block. While forming each groove in the test block and master block, the temperature of the groove forming machine, block, and diamond tool was maintained at 20° C.+/−0.01° C. The diamond tool was adjusted by making cuts in a 1 inch cube test block. The cuts in the test block were made by iteratively adjusting the diamond tool to adjust the groove angle to a tolerance of +/−30 arc seconds (0.008 degrees) and measuring the resultant angles on a precision rotary table and micro-interferometer to optically reference the plane of the groove surfaces. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco.

To maintain groove angle tolerances on the master, a diamond tool that was about 1° smaller than the smallest target groove angle was used to sequentially rough cut each groove in all three sets. Each groove was rough-cut back and forth to a depth that was 10 microns shallower than the target depth and a peak to valley surface finish of 0.000002 inches (0.000051 mm). To minimize diamond wear, the finish grooves were cut in the master in alternating directions to a peak to valley surface finish of 0.000001 inches (0.000025 mm). The first groove was finish cut in a first direction. The second groove was skipped and the third groove was finish cut in the same manner except in the opposite direction. The fourth groove was skipped and the fifth groove was finish cut in the first direction, etc., until the last groove at the bottom of the plate was formed. The diamond tool was then inspected for wear, as previously described, to insure that the average surface roughness continued to be no more than 3 nm and that the groove angle had not changed by more than 30 arc seconds (0.008 degrees). Then the alternating (i.e. skipped even numbered) grooves were finish cut from bottom to top in the same manner. The second and third groove sets were cut in the same fashion, inspecting the diamond tool prior to cutting the alternating grooves. In addition, the diamond tool was replaced and adjusted by use of the test block after each groove set.

For each of the comparative examples, the grooves were formed with constant groove spacing in each set throughout the array. For Comparative Example A, the first groove set is cut in the master plate with a pitch (i.e. groove spacing) of 0.003200 inches (0.081280 mm), a groove angle of 67.301 degrees and a cutting angle of 0 degrees. The second groove set is cut in the master plate having a pitch of 0.003102 inches (0.078791 mm), a groove angle of 72.081 degrees and a cutting angle +61 degrees (relative to the first direction), respectively. The third groove set is cut having a pitch, groove angle and cutting angle of 0.003102 inches (0.078791 mm), 72.081 degrees and −61 degrees (relative to the first direction), respectively. The groove depth for the first, second, and third directions was chosen such that the height of each cube was about 0.001476 inches (0.037490 mm).

Figure 2:
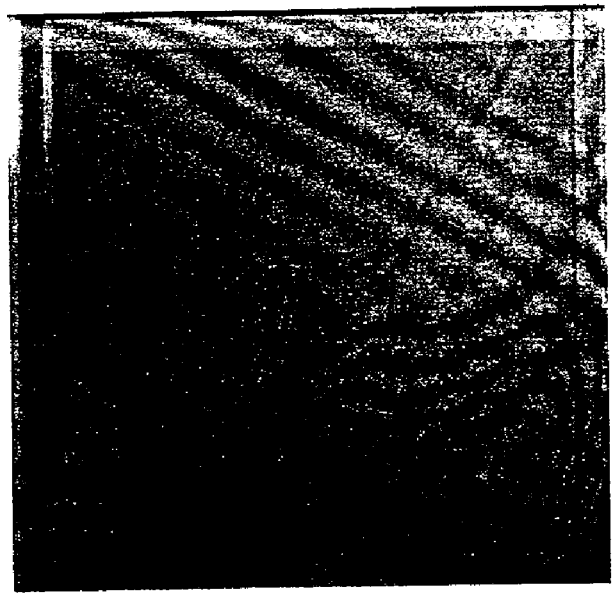
FIG. 2 depicts a photograph of a tooling that was a negative replica of a master having a constant groove spacing of less than 0.003500 inches (0.088900 mm) throughout the array wherein the grooves were cut with a precision at least as precise as +/−100 nm. The photograph was taken with an Olympus C700 digital camera using the flash at a distance of about 10 feet (3 meters).

The master was removed from the groove-forming machine. Toolings were made from the master by nickel electroforming the master as described in U.S. Pat. Nos. 4,478,769 and 5,156,863. Multigenerational positive and negative copies were formed such that the tools had substantially the same degree of precise cube formation as the master. An electroformed negative tool was used to impart the pattern of the tool onto a polycarbonate film having a thickness of approximately 200 microns and having an index of refraction of about 1.59. The negative tool was observed to have a moiré-like pattern, as depicted by FIG. 2. The tool was used in a compression molding press with the pressing performed at a temperature of approximately 375° F. (191° C.) to 385° F. (196° C.), a pressure of approximately 1600 psi, and a dwell time of 20 seconds. The molded polycarbonate was then cooled to about 200° F. (100° C.) over 5 minutes. The resulting sheeting had a structured surface comprising a plurality of cube-corner elements having a constant groove spacing with the base of the elements being integrally connected in the same plane in a continuous land layer, such land layer being substantially smooth and flat on the opposing surface such that the presence of the land layer does not detract from the retroreflective properties of the sheeting.

Retroreflective sheeting having a constant groove spacing of less than 0.003500 inches (0.088900 mm), prepared in same manner described in Comparative Example A, was evaluated by shining light from an ordinary flashlight held out from an observer's nose, illuminating the retroreflective sheeting normal to its plane. From a distance of about two feet, the light that retroreflected from the sheeting exhibited a moiré-like pattern when viewed by that same observer's eyes. The moiré-like pattern was retroreflected also as seen by that observer's eyes when the flashlight was replaced by the light specified as CIE Standard Illuminant A. The moiré-like pattern was clearly visible at distances of about 100 feet. The coefficient of retroreflection, $R_A$, was measured as recommended by CIE publication No. 54 at −4° entrance, 0° orientation, 0.2° observation. The average of 9 spot readings over the entire area of the sample was 764 candles per lux per square meter with a standard deviation of 36 candles per lux per square meter.

Comparative Example B

The cube-corner surface of the retroreflective sheeting of Comparative Example A was coated with aluminum by vapor deposition at a thickness of about 950 angstroms.

The resulting retroreflective sheeting was evaluated in the same manner as Comparative Example A. The light that retroreflected from the sheeting was observed to exhibit the moiré-like pattern. The coefficient of retroreflection, $R_A$, was measured as recommended by CIE publication No. 54 at −4° entrance, 0° orientation, 0.2° observation. The average of 9 spot readings over the entire area of the sample was 1085 candela per lux per square meter with a standard deviation of 37 candles per lux per square meter.

Comparative Example C

A master was made in the same manner as described in Comparative Example A. A positive copy tooling was used to form sheeting from that tooling. The cube-corner structured surface of this negative copy sheeting was coated with aluminum by vapor deposition.

The resulting retroreflective sheeting was evaluated in the same manner as Comparative Example A. The light that retroreflected from the sheeting was observed to exhibit the moiré-like pattern. The coefficient of retroreflection, $R_A$, was measured as recommended by CIE publication No. 54 at −4° entrance, 0° orientation, 0.2° observation. The average of 9 spot readings over the entire area of the sample was 1950 candela per lux per square meter with a standard deviation of 98 candles per lux per square meter.

Example 1

Three sets of grooves were made using the same cutting angles, groove angles, and groove depth as described in Comparative Example A, with the only difference being that the groove spacing was precisely varied. A random number generating computer software package commercially available from Microsoft under the trade designation "Microsoft Excel 97 SR-2" was used to generate the magnitude of the groove spacing variation within a specified range. The following equation was used:

=IF(MOD(A3, 10)=0, 0,(RAND( )*(0.00003—(−0.00003))+(−0.00003))*25.4)

The function acts on the input from cell "A3". If A3 is exactly divisible by ten the output is zero. If A3 is not exactly divisible by ten the output is a random number between 0.00003 and −0.00003. The multiplicative factor of 25.4 converts the random numbers into position in millimeters. This function generated a list of random numbers, the first 1260 of such random numbers are set forth in Tables I to IV as follows.

The odd columns show the index (i.e. cell "A3" in equation) input to the "MOD" function of the equation. The even columns are the random numbers generated by the equation. This formula was selected such that every 10th groove in all three sets would have a "perfect" intersection rather than randomly varied groove intersections. By doing so, the master could be inspected with a microscope in order to easily verify that the actual groove spacing was as intended.

TABLE I

| index | Random # |
|---|---|
| 1 | −0.00023 |
| 2 | 0.00002 |
| 3 | −0.00076 |
| 4 | −0.00001 |
| 5 | −0.00006 |
| 6 | 0.00028 |
| 7 | −0.0001 |
| 8 | −0.00028 |
| 9 | 0.00011 |
| 10 | 0 |
| 11 | 0.00005 |
| 12 | −0.00036 |
| 13 | −0.00016 |
| 14 | −0.00004 |
| 15 | −0.00051 |
| 16 | −0.00074 |
| 17 | 0.00031 |
| 18 | −0.00074 |
| 19 | −0.00039 |
| 20 | 0 |
| 21 | −0.00049 |
| 22 | 0.00004 |
| 23 | 0.00027 |
| 24 | −0.00054 |
| 25 | 0.00048 |
| 26 | −0.00053 |
| 27 | −0.00047 |
| 28 | 0.00066 |
| 29 | 0.00001 |
| 30 | 0 |
| 31 | −0.00019 |
| 32 | −0.00026 |
| 33 | 0.00051 |
| 34 | 0.00057 |
| 35 | −0.00018 |
| 36 | −0.00023 |
| 37 | 0.00011 |
| 38 | −0.00028 |
| 39 | −0.00043 |
| 40 | 0 |
| 41 | −0.00026 |
| 42 | −0.00075 |
| 43 | −0.00062 |
| 44 | −0.00004 |
| 45 | −0.00005 |
| 46 | −0.00053 |
| 47 | −0.0005 |
| 48 | −0.00058 |
| 49 | −0.00003 |
| 50 | 0 |
| 51 | 0.00016 |
| 52 | −0.00022 |
| 53 | 0.00053 |
| 54 | 0.00048 |
| 55 | −0.00024 |
| 56 | −0.00025 |
| 57 | 0.00058 |
| 58 | 0.00057 |
| 59 | 0.0006 |
| 60 | 0 |
| 61 | −0.0001 |
| 62 | 0.00025 |
| 63 | −0.00047 |
| 64 | 0.00066 |
| 65 | 0.00028 |
| 66 | −0.00028 |
| 67 | −0.00008 |
| 68 | −0.00056 |
| 69 | 0.00052 |
| 70 | 0 |
| 71 | 0.00035 |
| 72 | 0.00062 |
| 73 | −0.00002 |
| 74 | 0.00054 |
| 75 | 0.00055 |
| 76 | 0.00021 |
| 77 | 0.00035 |
| 78 | 0.00035 |
| 79 | 0.00014 |
| 80 | 0 |
| 81 | 0.0006 |
| 82 | −0.00034 |
| 83 | −0.00036 |
| 84 | −0.00069 |
| 85 | 0.00042 |
| 86 | −0.00048 |
| 87 | −0.00064 |
| 88 | −0.00001 |
| 89 | 0.00023 |
| 90 | 0 |
| 91 | 0.00038 |
| 92 | −0.00062 |
| 93 | −0.0006 |
| 94 | 0.00005 |

TABLE I-continued

| index | Random # |
|---|---|
| 95 | −0.0001 |
| 96 | −0.00061 |
| 97 | 0.00038 |
| 98 | 0.00068 |
| 99 | −0.00036 |
| 100 | 0 |
| 101 | −0.00037 |
| 102 | 0.00028 |
| 103 | −0.00022 |
| 104 | 0.00064 |
| 105 | 0.00014 |
| 106 | 0.00021 |
| 107 | −0.00071 |
| 108 | 0.00055 |
| 109 | 0.00069 |
| 110 | 0 |
| 111 | −0.00033 |
| 112 | 0.00022 |
| 113 | −0.00017 |
| 114 | −0.00024 |
| 115 | 0.00019 |
| 116 | 0.00003 |
| 117 | −0.00014 |
| 118 | 0.00074 |
| 119 | −0.00075 |
| 120 | 0 |
| 121 | 0.00008 |
| 122 | 0 |
| 123 | −0.00014 |
| 124 | 0.00025 |
| 125 | −0.00026 |
| 126 | −0.0006 |
| 127 | 0.00074 |
| 128 | 0.00024 |
| 129 | 0.00046 |
| 130 | 0 |
| 131 | 0.00064 |
| 132 | 0.00039 |
| 133 | −0.00032 |
| 134 | −0.00039 |
| 135 | 0.00053 |
| 136 | −0.00075 |
| 137 | −0.00008 |
| 138 | 0.00066 |
| 139 | 0.00032 |
| 140 | 0 |
| 141 | 0.00045 |
| 142 | −0.00057 |
| 143 | 0.00009 |
| 144 | 0.00057 |
| 145 | 0.00024 |
| 146 | −0.00073 |
| 147 | −0.00059 |
| 148 | 0.00022 |
| 149 | 0.00026 |
| 150 | 0 |
| 151 | 0.00026 |
| 152 | 0.00004 |
| 153 | −0.00067 |
| 154 | 0.00029 |
| 155 | −0.00075 |
| 156 | −0.00075 |
| 157 | 0.00004 |
| 158 | 0.00009 |
| 159 | 0.00013 |
| 160 | 0 |
| 161 | −0.00023 |
| 162 | 0.00068 |
| 163 | −0.00037 |
| 164 | −0.00056 |
| 165 | 0.00002 |
| 166 | −0.00013 |
| 167 | 0.00053 |
| 168 | 0.00055 |
| 169 | −0.0004 |
| 170 | 0 |
| 171 | −0.00044 |
| 172 | −0.00066 |
| 173 | 0.00057 |
| 174 | −0.00044 |
| 175 | 0.00046 |
| 176 | 0.00033 |
| 177 | 0.00015 |
| 178 | 0.00008 |
| 179 | −0.00003 |
| 180 | 0 |
| 181 | 0.00025 |
| 182 | −0.00034 |
| 183 | 0.0007 |
| 184 | 0.00039 |
| 185 | 0.00074 |
| 186 | 0.00006 |
| 187 | 0.0007 |
| 188 | 0.00066 |
| 189 | 0.00042 |
| 190 | 0 |
| 191 | −0.00019 |
| 192 | −0.0007 |
| 193 | −0.00043 |
| 194 | 0.00028 |
| 195 | −0.00017 |
| 196 | −0.00067 |
| 197 | −0.00002 |
| 198 | −0.00064 |
| 199 | −0.0002 |
| 200 | 0 |
| 201 | 0.00037 |
| 202 | −0.00056 |
| 203 | 0.00054 |
| 204 | −0.00031 |
| 205 | 0.00056 |
| 206 | −0.00039 |
| 207 | 0.00075 |
| 208 | 0.00051 |
| 209 | 0.00008 |
| 210 | 0 |
| 211 | −0.00072 |
| 212 | 0.00056 |
| 213 | 0.00011 |
| 214 | 0.00069 |
| 215 | 0.0003 |
| 216 | 0.00017 |
| 217 | 0.00051 |
| 218 | 0.00059 |
| 219 | 0.00072 |
| 220 | 0 |
| 221 | −0.00048 |
| 222 | −0.00011 |
| 223 | 0.0001 |
| 224 | 0.00003 |
| 225 | −0.00014 |
| 226 | −0.00031 |
| 227 | 0.00004 |
| 228 | 0.00044 |
| 229 | 0.00002 |
| 230 | 0 |
| 231 | −0.00057 |
| 232 | 0.00059 |
| 233 | 0.00047 |
| 234 | 0.00022 |
| 235 | −0.00012 |
| 236 | 0.0003 |
| 237 | −0.00001 |
| 238 | −0.00028 |
| 239 | 0.0006 |
| 240 | 0 |
| 241 | 0.00034 |
| 242 | 0.00059 |
| 243 | 0.0002 |
| 244 | −0.00034 |
| 245 | −0.00035 |
| 246 | −0.00069 |
| 247 | −0.00062 |
| 248 | −0.00018 |

TABLE I-continued

| index | Random # |
|---|---|
| 249 | −0.00053 |
| 250 | 0 |
| 251 | −0.00063 |
| 252 | 0.00052 |
| 253 | −0.00019 |
| 254 | 0.00031 |
| 255 | 0.00042 |
| 256 | −0.00015 |
| 257 | 0.00052 |
| 258 | −0.0003 |
| 259 | 0.00044 |
| 260 | 0 |
| 261 | 0.00045 |
| 262 | −0.0004 |
| 263 | −0.00031 |
| 264 | −0.00042 |
| 265 | −0.00075 |
| 266 | −0.00034 |
| 267 | −0.00039 |
| 268 | −0.00001 |
| 269 | 0.0006 |
| 270 | 0 |
| 271 | −0.00026 |
| 272 | 0.00005 |
| 273 | 0.0006 |
| 274 | 0.00011 |
| 275 | −0.00069 |
| 276 | −0.00056 |
| 277 | 0.00041 |
| 278 | −0.00061 |
| 279 | 0.00039 |
| 280 | 0 |
| 281 | 0.00059 |
| 282 | 0.00038 |
| 283 | −0.00064 |
| 284 | 0.00073 |
| 285 | 0.0002 |
| 286 | −0.00013 |
| 287 | 0.00053 |
| 288 | 0.00046 |
| 289 | −0.00026 |
| 290 | 0 |
| 291 | 0.00032 |
| 292 | 0.00027 |
| 293 | −0.00049 |
| 294 | 0.00021 |
| 295 | 0.00008 |
| 296 | 0.00049 |
| 297 | −0.0005 |
| 298 | −0.0002 |
| 299 | −0.00039 |
| 300 | 0 |
| 301 | 0.00012 |
| 302 | −0.00044 |
| 303 | −0.00012 |
| 304 | 0.0001 |
| 305 | 0.00049 |
| 306 | 0.00023 |
| 307 | −0.00017 |
| 308 | 0.00026 |
| 309 | −0.00031 |
| 310 | 0 |
| 311 | 0.00076 |
| 312 | −0.00029 |
| 313 | −0.00074 |
| 314 | −0.00016 |
| 315 | 0.00001 |

TABLE II

| Index | Random # |
|---|---|
| 316 | 0.00067 |
| 317 | −0.0003 |

TABLE II-continued

| Index | Random # |
|---|---|
| 318 | −0.00028 |
| 319 | 0.00061 |
| 320 | 0 |
| 321 | −0.00008 |
| 322 | −0.00034 |
| 323 | −0.0004 |
| 324 | 0.00031 |
| 325 | −0.00053 |
| 326 | −0.00035 |
| 327 | 0.00002 |
| 328 | 0.00013 |
| 329 | −0.00044 |
| 330 | 0 |
| 331 | −0.00026 |
| 332 | 0.00038 |
| 333 | 0.00046 |
| 334 | −0.0006 |
| 335 | 0.00017 |
| 336 | 0.00053 |
| 337 | −0.0002 |
| 338 | 0.00067 |
| 339 | 0.0005 |
| 340 | 0 |
| 341 | −0.00044 |
| 342 | −0.0002 |
| 343 | 0.00009 |
| 344 | −0.00022 |
| 345 | −0.00022 |
| 346 | −0.00065 |
| 347 | −0.00072 |
| 348 | −0.00011 |
| 349 | 0.00006 |
| 350 | 0 |
| 351 | 0.00033 |
| 352 | −0.00012 |
| 353 | −0.00033 |
| 354 | 0.00051 |
| 355 | −0.00023 |
| 356 | −0.00017 |
| 357 | −0.00007 |
| 358 | −0.00039 |
| 359 | 0.00068 |
| 360 | 0 |
| 361 | 0.00039 |
| 362 | −0.00042 |
| 363 | −0.00045 |
| 364 | −0.00026 |
| 365 | −0.00058 |
| 366 | −0.00027 |
| 367 | −0.00033 |
| 368 | 0.00035 |
| 369 | −0.00033 |
| 370 | 0 |
| 371 | −0.00056 |
| 372 | 0.00061 |
| 373 | 0.00008 |
| 374 | −0.00024 |
| 375 | 0.00038 |
| 376 | 0.00001 |
| 377 | 0.00016 |
| 378 | 0.00046 |
| 379 | −0.0007 |
| 380 | 0 |
| 381 | −0.00009 |
| 382 | 0.00052 |
| 383 | 0.00024 |
| 384 | 0.00044 |
| 385 | −0.00041 |
| 386 | 0.0002 |
| 387 | 0.00042 |
| 388 | 0.00066 |
| 389 | 0.00001 |
| 390 | 0 |
| 391 | 0.00013 |
| 392 | −0.00072 |
| 393 | −0.00003 |
| 394 | 0.00016 |

TABLE II-continued

| Index | Random # |
|---|---|
| 395 | 0.00047 |
| 396 | −0.00022 |
| 397 | 0.0001 |
| 398 | 0.00053 |
| 399 | 0.00027 |
| 400 | 0 |
| 401 | 0.00032 |
| 402 | 0.00074 |
| 403 | −0.00025 |
| 404 | 0.00062 |
| 405 | −0.00017 |
| 406 | 0.00057 |
| 407 | −0.00047 |
| 408 | 0.00067 |
| 409 | 0.00057 |
| 410 | 0 |
| 411 | −0.00063 |
| 412 | −0.00014 |
| 413 | 0.00071 |
| 414 | −0.00041 |
| 415 | −0.0004 |
| 416 | −0.00014 |
| 417 | 0.00052 |
| 418 | −0.00051 |
| 419 | 0.0004 |
| 420 | 0 |
| 421 | 0.00047 |
| 422 | 0.00071 |
| 423 | 0.00049 |
| 424 | 0.00067 |
| 425 | −0.00071 |
| 426 | 0.00052 |
| 427 | 0.00011 |
| 428 | 0.00033 |
| 429 | −0.00036 |
| 430 | 0 |
| 431 | −0.00056 |
| 432 | 0.00068 |
| 433 | −0.00066 |
| 434 | −0.00058 |
| 435 | −0.00042 |
| 436 | 0.00064 |
| 437 | 0.00071 |
| 438 | 0.00005 |
| 439 | 0.00035 |
| 440 | 0 |
| 441 | 0.00023 |
| 442 | −0.00061 |
| 443 | 0.00025 |
| 444 | 0 |
| 445 | −0.00075 |
| 446 | −0.00049 |
| 447 | 0.00058 |
| 448 | 0.00038 |
| 449 | −0.00046 |
| 450 | 0 |
| 451 | −0.00059 |
| 452 | −0.00035 |
| 453 | −0.00063 |
| 454 | 0.00066 |
| 455 | 0.00004 |
| 456 | −0.00031 |
| 457 | −0.00038 |
| 458 | 0.00063 |
| 459 | −0.00023 |
| 460 | 0 |
| 461 | 0.00015 |
| 462 | 0.00033 |
| 463 | 0 |
| 464 | 0.00055 |
| 465 | −0.00012 |
| 466 | −0.00056 |
| 467 | −0.00075 |
| 468 | −0.00045 |
| 469 | 0.00045 |
| 470 | 0 |
| 471 | −0.00002 |
| 472 | −0.00037 |
| 473 | 0.0001 |
| 474 | 0.00075 |
| 475 | −0.00002 |
| 476 | −0.00014 |
| 477 | −0.00021 |
| 478 | 0.00067 |
| 479 | 0.00068 |
| 480 | 0 |
| 481 | 0.00045 |
| 482 | 0.0006 |
| 483 | 0.00063 |
| 484 | −0.00057 |
| 485 | 0.00018 |
| 486 | 0.00056 |
| 487 | −0.00076 |
| 488 | −0.00024 |
| 489 | −0.00024 |
| 490 | 0 |
| 491 | 0.00014 |
| 492 | −0.00037 |
| 493 | 0.00042 |
| 494 | 0.0003 |
| 495 | 0.00049 |
| 496 | −0.00042 |
| 497 | −0.00036 |
| 498 | −0.00048 |
| 499 | 0.00025 |
| 500 | 0 |
| 501 | 0.00034 |
| 502 | 0.00056 |
| 503 | −0.00058 |
| 504 | −0.00066 |
| 505 | 0.0006 |
| 506 | −0.00069 |
| 507 | −0.00015 |
| 508 | −0.00047 |
| 509 | 0.00066 |
| 510 | 0 |
| 511 | −0.00026 |
| 512 | 0.00036 |
| 513 | −0.00056 |
| 514 | −0.00043 |
| 515 | 0.00045 |
| 516 | −0.00021 |
| 517 | 0.00033 |
| 518 | −0.00019 |
| 519 | 0.00045 |
| 520 | 0 |
| 521 | 0.00071 |
| 522 | −0.00016 |
| 523 | −0.00027 |
| 524 | −0.00011 |
| 525 | 0.00013 |
| 526 | −0.0001 |
| 527 | −0.00038 |
| 528 | 0.00045 |
| 529 | −0.00034 |
| 530 | 0 |
| 531 | −0.00025 |
| 532 | 0.00049 |
| 533 | −0.00019 |
| 534 | −0.00059 |
| 535 | 0.00057 |
| 536 | 0.00037 |
| 537 | 0.00071 |
| 538 | 0.00048 |
| 539 | −0.00045 |
| 540 | 0 |
| 541 | 0.00008 |
| 542 | −0.00016 |
| 543 | −0.00072 |
| 544 | −0.0005 |
| 545 | 0.00004 |
| 546 | 0.00029 |
| 547 | 0.00056 |
| 548 | 0.00025 |

TABLE II-continued

| Index | Random # |
|---|---|
| 549 | −0.00044 |
| 550 | 0 |
| 551 | 0.00018 |
| 552 | 0.00015 |
| 553 | 0 |
| 554 | −0.00035 |
| 555 | 0.00028 |
| 556 | −0.00058 |
| 557 | 0.00016 |
| 558 | −0.00053 |
| 559 | 0.00037 |
| 560 | 0 |
| 561 | −0.00025 |
| 562 | −0.00041 |
| 563 | 0.00031 |
| 564 | 0.00029 |
| 565 | −0.0005 |
| 566 | −0.00042 |
| 567 | 0.00074 |
| 568 | −0.00054 |
| 569 | −0.00005 |
| 570 | 0 |
| 571 | 0.00065 |
| 572 | 0.00063 |
| 573 | −0.00065 |
| 574 | 0.00038 |
| 575 | −0.00047 |
| 576 | 0.00001 |
| 577 | −0.0002 |
| 578 | −0.00029 |
| 579 | −0.00025 |
| 580 | 0 |
| 581 | −0.00002 |
| 582 | −0.00016 |
| 583 | −0.00022 |
| 584 | −0.00003 |
| 585 | 0.00013 |
| 586 | −0.00014 |
| 587 | 0.00018 |
| 588 | 0.00055 |
| 589 | 0.00026 |
| 590 | 0 |
| 591 | 0.00032 |
| 592 | 0.00035 |
| 593 | 0.00056 |
| 594 | −0.00008 |
| 595 | −0.00038 |
| 596 | 0.00011 |
| 597 | −0.00054 |
| 598 | −0.00052 |
| 599 | 0.00029 |
| 600 | 0 |
| 601 | 0.00015 |
| 602 | −0.00045 |
| 603 | −0.00013 |
| 604 | −0.00026 |
| 605 | −0.00064 |
| 606 | −0.00051 |
| 607 | 0.00029 |
| 608 | 0.00003 |
| 609 | −0.00021 |
| 610 | 0 |
| 611 | 0.00001 |
| 612 | −0.0007 |
| 613 | 0.00055 |
| 614 | 0.00042 |
| 615 | −0.00062 |
| 616 | −0.00025 |
| 617 | 0.00068 |
| 618 | −0.00073 |
| 619 | −0.00005 |
| 620 | 0 |
| 621 | −0.00048 |
| 622 | 0.00055 |
| 623 | 0.00075 |
| 624 | 0.00006 |
| 625 | −0.00042 |

TABLE II-continued

| Index | Random # |
|---|---|
| 626 | 0.00052 |
| 627 | 0.00076 |
| 628 | −0.00075 |
| 629 | 0.00076 |
| 630 | 0 |

TABLE III

| index | Random # |
|---|---|
| 631 | 0.00024 |
| 632 | −0.00043 |
| 633 | 0.00075 |
| 634 | −0.00056 |
| 635 | −0.00051 |
| 636 | 0.00028 |
| 637 | −0.00033 |
| 638 | 0.00026 |
| 639 | −0.0002 |
| 640 | 0 |
| 641 | −0.00032 |
| 642 | −0.00042 |
| 643 | −0.00059 |
| 644 | −0.00058 |
| 645 | −0.00057 |
| 646 | −0.00068 |
| 647 | 0.00035 |
| 648 | −0.00025 |
| 649 | 0.00015 |
| 650 | 0 |
| 651 | −0.00001 |
| 652 | −0.00033 |
| 653 | 0.00048 |
| 654 | −0.00052 |
| 655 | −0.00003 |
| 656 | 0.00026 |
| 657 | 0.00033 |
| 658 | 0.00073 |
| 659 | −0.00071 |
| 660 | 0 |
| 661 | 0.00011 |
| 662 | −0.00014 |
| 663 | 0.00011 |
| 664 | 0.00006 |
| 665 | −0.00012 |
| 666 | −0.00061 |
| 667 | −0.0002 |
| 668 | 0.00062 |
| 669 | 0.00015 |
| 670 | 0 |
| 671 | 0.00051 |
| 672 | −0.00021 |
| 673 | −0.00058 |
| 674 | 0.00015 |
| 675 | −0.00056 |
| 676 | 0.00009 |
| 677 | −0.00043 |
| 678 | 0.00006 |
| 679 | 0.00076 |
| 680 | 0 |
| 681 | 0.00008 |
| 682 | 0.00066 |
| 683 | −0.00038 |
| 684 | −0.00054 |
| 685 | −0.0002 |
| 686 | 0.00002 |
| 687 | −0.00041 |
| 688 | −0.00066 |
| 689 | 0.00048 |
| 690 | 0 |
| 691 | −0.00046 |
| 692 | −0.00036 |
| 693 | −0.00057 |
| 694 | 0.00046 |

TABLE III-continued

| index | Random # |
|---|---|
| 695 | −0.00043 |
| 696 | 0.00053 |
| 697 | −0.00046 |
| 698 | 0.00046 |
| 699 | −0.00022 |
| 700 | 0 |
| 701 | −0.00016 |
| 702 | −0.00071 |
| 703 | −0.0001 |
| 704 | 0.00015 |
| 705 | 0.00015 |
| 706 | 0.00049 |
| 707 | 0.00036 |
| 708 | 0.00022 |
| 709 | 0.00035 |
| 710 | 0 |
| 711 | −0.00075 |
| 712 | −0.00075 |
| 713 | 0.00058 |
| 714 | 0.00037 |
| 715 | −0.00055 |
| 716 | −0.00056 |
| 717 | −0.00057 |
| 718 | −0.00022 |
| 719 | 0.00038 |
| 720 | 0 |
| 721 | −0.00062 |
| 722 | −0.00045 |
| 723 | −0.00005 |
| 724 | 0.00004 |
| 725 | −0.00041 |
| 726 | −0.00016 |
| 727 | 0.00033 |
| 728 | 0.00075 |
| 729 | 0.00072 |
| 730 | 0 |
| 731 | 0.00016 |
| 732 | −0.00071 |
| 733 | −0.0004 |
| 734 | −0.00034 |
| 735 | −0.00021 |
| 736 | −0.00028 |
| 737 | −0.00028 |
| 738 | 0.00068 |
| 739 | 0.00046 |
| 740 | 0 |
| 741 | 0.00018 |
| 742 | 0.00059 |
| 743 | 0.00024 |
| 744 | −0.00037 |
| 745 | 0.00008 |
| 746 | −0.00029 |
| 747 | −0.00011 |
| 748 | −0.00054 |
| 749 | 0.00024 |
| 750 | 0 |
| 751 | 0.0005 |
| 752 | 0.00023 |
| 753 | −0.00035 |
| 754 | 0.0003 |
| 755 | 0.00049 |
| 756 | −0.00015 |
| 757 | 0.0007 |
| 758 | 0.0002 |
| 759 | −0.00018 |
| 760 | 0 |
| 761 | 0.00009 |
| 762 | −0.00054 |
| 763 | 0.0006 |
| 764 | 0.00065 |
| 765 | −0.00032 |
| 766 | 0.00055 |
| 767 | −0.00028 |
| 768 | 0.00045 |
| 769 | −0.00002 |
| 770 | 0 |
| 771 | 0 |
| 772 | −0.00075 |
| 773 | 0.00023 |
| 774 | 0.00048 |
| 775 | 0.00047 |
| 776 | −0.00022 |
| 777 | −0.00015 |
| 778 | 0.00052 |
| 779 | 0.00035 |
| 780 | 0 |
| 781 | −0.00049 |
| 782 | −0.00071 |
| 783 | 0.00019 |
| 784 | 0.00064 |
| 785 | 0.00076 |
| 786 | −0.00033 |
| 787 | 0.00003 |
| 788 | −0.00053 |
| 789 | −0.00062 |
| 790 | 0 |
| 791 | 0.00071 |
| 792 | −0.00046 |
| 793 | 0.00005 |
| 794 | 0.00074 |
| 795 | 0.00034 |
| 796 | −0.00057 |
| 797 | −0.00009 |
| 798 | −0.00018 |
| 799 | 0.00021 |
| 800 | 0 |
| 801 | −0.00055 |
| 802 | −0.00063 |
| 803 | 0.00058 |
| 804 | −0.00008 |
| 805 | 0.00074 |
| 806 | −0.00037 |
| 807 | −0.00009 |
| 808 | −0.00009 |
| 809 | 0.00033 |
| 810 | 0 |
| 811 | 0.00046 |
| 812 | −0.00063 |
| 813 | 0.00065 |
| 814 | −0.00036 |
| 815 | 0.00005 |
| 816 | −0.00076 |
| 817 | −0.00002 |
| 818 | 0.00055 |
| 819 | 0.00048 |
| 820 | 0 |
| 821 | 0.00054 |
| 822 | −0.00017 |
| 823 | −0.00073 |
| 824 | 0.00012 |
| 825 | −0.00021 |
| 826 | −0.00057 |
| 827 | −0.00037 |
| 828 | −0.00022 |
| 829 | −0.00027 |
| 830 | 0 |
| 831 | 0.00057 |
| 832 | 0.00016 |
| 833 | 0.00009 |
| 834 | 0.00072 |
| 835 | −0.00053 |
| 836 | 0.00071 |
| 837 | −0.00024 |
| 838 | 0.00019 |
| 839 | −0.0001 |
| 840 | 0 |
| 841 | 0.00026 |
| 842 | 0.00036 |
| 843 | −0.00036 |
| 844 | −0.00005 |
| 845 | −0.00059 |
| 846 | 0.00049 |
| 847 | −0.00055 |
| 848 | −0.00059 |

TABLE III-continued

| index | Random # |
|---|---|
| 849 | 0.00035 |
| 850 | 0 |
| 851 | −0.00029 |
| 852 | 0.00043 |
| 853 | 0.00035 |
| 854 | 0.00071 |
| 855 | 0.00045 |
| 856 | 0.00004 |
| 857 | −0.00003 |
| 858 | −0.00038 |
| 859 | −0.00031 |
| 860 | 0 |
| 861 | 0.00036 |
| 862 | 0.0006 |
| 863 | 0.00045 |
| 864 | 0.00055 |
| 865 | −0.00007 |
| 866 | −0.00074 |
| 867 | 0.00031 |
| 868 | 0.0004 |
| 869 | 0.00039 |
| 870 | 0 |
| 871 | 0.00002 |
| 872 | 0.00036 |
| 873 | −0.0003 |
| 874 | −0.00059 |
| 875 | 0.00063 |
| 876 | −0.00028 |
| 877 | −0.00057 |
| 878 | −0.00037 |
| 879 | 0.00014 |
| 880 | 0 |
| 881 | 0.00047 |
| 882 | −0.00011 |
| 883 | 0.00042 |
| 884 | −0.00054 |
| 885 | −0.00001 |
| 886 | 0.0003 |
| 887 | 0.00018 |
| 888 | −0.00008 |
| 889 | −0.00029 |
| 890 | 0 |
| 891 | −0.00006 |
| 892 | −0.00059 |
| 893 | −0.00049 |
| 894 | −0.0001 |
| 895 | −0.00025 |
| 896 | −0.00008 |
| 897 | 0.0002 |
| 898 | −0.00014 |
| 899 | −0.00044 |
| 900 | 0 |
| 901 | 0.00042 |
| 902 | −0.00036 |
| 903 | −0.00057 |
| 904 | −0.00023 |
| 905 | 0.00058 |
| 906 | −0.00022 |
| 907 | −0.0007 |
| 908 | 0.00062 |
| 909 | 0.00012 |
| 910 | 0 |
| 911 | −0.00037 |
| 912 | −0.00067 |
| 913 | 0.00031 |
| 914 | −0.00055 |
| 915 | 0.00019 |
| 916 | −0.00003 |
| 917 | 0.00022 |
| 918 | −0.00015 |
| 919 | −0.00019 |
| 920 | 0 |
| 921 | −0.00065 |
| 922 | 0.00062 |
| 923 | −0.00005 |
| 924 | −0.00063 |
| 925 | −0.0007 |

TABLE III-continued

| index | Random # |
|---|---|
| 926 | 0.0004 |
| 927 | −0.00059 |
| 928 | 0.00069 |
| 929 | 0.00008 |
| 930 | 0 |
| 931 | −0.0007 |
| 932 | −0.00066 |
| 933 | 0.00072 |
| 934 | −0.00015 |
| 935 | −0.00031 |
| 936 | 0.00062 |
| 937 | −0.00062 |
| 938 | 0.00027 |
| 939 | −0.00029 |
| 940 | 0 |
| 941 | 0.00074 |
| 942 | −0.00057 |
| 943 | 0.00075 |
| 944 | −0.00019 |
| 945 | −0.0007 |

TABLE IV

| Index | Random # |
|---|---|
| 946 | 0.00036 |
| 947 | 0.00014 |
| 948 | 0.00034 |
| 949 | 0.00044 |
| 950 | 0 |
| 951 | 0.00065 |
| 952 | 0.00066 |
| 953 | 0.00004 |
| 954 | 0.00057 |
| 955 | −0.00033 |
| 956 | −0.00016 |
| 957 | −0.00004 |
| 958 | 0.00031 |
| 959 | 0.00002 |
| 960 | 0 |
| 961 | 0.00045 |
| 962 | −0.00027 |
| 963 | −0.00061 |
| 964 | −0.00041 |
| 965 | 0.00026 |
| 966 | 0.00063 |
| 967 | −0.00071 |
| 968 | 0.00067 |
| 969 | 0.00031 |
| 970 | 0 |
| 971 | 0.00023 |
| 972 | −0.00012 |
| 973 | 0.00034 |
| 974 | 0.00066 |
| 975 | −0.00069 |
| 976 | 0.00067 |
| 977 | −0.00001 |
| 978 | −0.00026 |
| 979 | −0.00015 |
| 980 | 0 |
| 981 | −0.00069 |
| 982 | −0.00036 |
| 983 | −0.00053 |
| 984 | 0.00058 |
| 985 | −0.00032 |
| 986 | −0.00068 |
| 987 | 0.00011 |
| 988 | −0.00067 |
| 989 | −0.00036 |
| 990 | 0 |
| 991 | −0.00003 |
| 992 | −0.00058 |
| 993 | 0.00018 |
| 994 | 0.00059 |

TABLE IV-continued

| Index | Random # |
|-------|----------|
| 995   | 0.00056  |
| 996   | −0.00029 |
| 997   | −0.00057 |
| 998   | −0.00071 |
| 999   | 0.00021  |
| 1000  | 0        |
| 1001  | 0.00014  |
| 1002  | −0.00053 |
| 1003  | −0.00002 |
| 1004  | 0.00065  |
| 1005  | 0.0005   |
| 1006  | −0.00035 |
| 1007  | −0.00031 |
| 1008  | 0.0007   |
| 1009  | −0.00058 |
| 1010  | 0        |
| 1011  | −0.00019 |
| 1012  | −0.00058 |
| 1013  | 0.00011  |
| 1014  | −0.0003  |
| 1015  | 0.00013  |
| 1016  | −0.0002  |
| 1017  | 0.0007   |
| 1018  | 0.00067  |
| 1019  | 0.00001  |
| 1020  | 0        |
| 1021  | −0.00056 |
| 1022  | −0.00043 |
| 1023  | −0.00038 |
| 1024  | 0.00066  |
| 1025  | −0.00029 |
| 1026  | −0.00071 |
| 1027  | 0.00064  |
| 1028  | 0.00066  |
| 1029  | −0.00034 |
| 1030  | 0        |
| 1031  | −0.0001  |
| 1032  | 0.0002   |
| 1033  | −0.0004  |
| 1034  | 0.00071  |
| 1035  | −0.00025 |
| 1036  | 0.00018  |
| 1037  | 0.00069  |
| 1038  | 0.00071  |
| 1039  | −0.0002  |
| 1040  | 0        |
| 1041  | −0.00006 |
| 1042  | −0.00056 |
| 1043  | 0.0003   |
| 1044  | 0.00074  |
| 1045  | −0.00058 |
| 1046  | 0.00003  |
| 1047  | 0.00041  |
| 1048  | 0.0003   |
| 1049  | 0.00029  |
| 1050  | 0        |
| 1051  | 0.00045  |
| 1052  | −0.00006 |
| 1053  | −0.00054 |
| 1054  | 0.00002  |
| 1055  | 0.00025  |
| 1056  | −0.00003 |
| 1057  | −0.00047 |
| 1058  | −0.00008 |
| 1059  | 0.00023  |
| 1060  | 0        |
| 1061  | 0.00011  |
| 1062  | 0        |
| 1063  | −0.00029 |
| 1064  | −0.0004  |
| 1065  | −0.00012 |
| 1066  | 0.00046  |
| 1067  | 0.00019  |
| 1068  | 0.00058  |
| 1069  | 0.00045  |
| 1070  | 0        |
| 1071  | 0.00046  |
| 1072  | −0.00012 |
| 1073  | 0.00003  |
| 1074  | −0.00025 |
| 1075  | 0.00067  |
| 1076  | 0        |
| 1077  | 0.00059  |
| 1078  | −0.00039 |
| 1079  | −0.00074 |
| 1080  | 0        |
| 1081  | −0.00045 |
| 1082  | −0.00016 |
| 1083  | 0.00064  |
| 1084  | −0.00069 |
| 1085  | 0.00046  |
| 1086  | −0.00031 |
| 1087  | −0.00045 |
| 1088  | −0.00027 |
| 1089  | 0.00013  |
| 1090  | 0        |
| 1091  | −0.00057 |
| 1092  | −0.00048 |
| 1093  | −0.00069 |
| 1094  | 0.00056  |
| 1095  | 0.00017  |
| 1096  | −0.00037 |
| 1097  | −0.0002  |
| 1098  | 0.00038  |
| 1099  | 0.00026  |
| 1100  | 0        |
| 1101  | 0.00043  |
| 1102  | −0.00012 |
| 1103  | −0.00013 |
| 1104  | −0.00045 |
| 1105  | 0.00057  |
| 1106  | −0.00047 |
| 1107  | 0.00021  |
| 1108  | 0.0005   |
| 1109  | 0.0005   |
| 1110  | 0        |
| 1111  | −0.00011 |
| 1112  | −0.00068 |
| 1113  | 0.00024  |
| 1114  | 0.0007   |
| 1115  | 0.00016  |
| 1116  | −0.00041 |
| 1117  | 0.00019  |
| 1118  | 0.00034  |
| 1119  | 0.00038  |
| 1120  | 0        |
| 1121  | −0.00033 |
| 1122  | −0.00057 |
| 1123  | 0.00006  |
| 1124  | −0.00003 |
| 1125  | −0.00056 |
| 1126  | 0.00005  |
| 1127  | −0.0002  |
| 1128  | −0.00054 |
| 1129  | −0.00056 |
| 1130  | 0        |
| 1131  | 0.00062  |
| 1132  | −0.00002 |
| 1133  | 0.00018  |
| 1134  | −0.00073 |
| 1135  | −0.00028 |
| 1136  | 0.00031  |
| 1137  | −0.00051 |
| 1138  | 0.00046  |
| 1139  | 0.00076  |
| 1140  | 0        |
| 1141  | 0.00019  |
| 1142  | −0.00064 |
| 1143  | −0.0003  |
| 1144  | 0.0003   |
| 1145  | −0.00039 |
| 1146  | −0.00022 |
| 1147  | 0.00015  |
| 1148  | 0.00001  |

TABLE IV-continued

| Index | Random # |
|---|---|
| 1149 | 0.00075 |
| 1150 | 0 |
| 1151 | −0.00043 |
| 1152 | 0.00021 |
| 1153 | 0.00024 |
| 1154 | 0.00025 |
| 1155 | 0.00076 |
| 1156 | −0.0003 |
| 1157 | −0.00055 |
| 1158 | −0.00066 |
| 1159 | 0.00056 |
| 1160 | 0 |
| 1161 | 0.00051 |
| 1162 | −0.00046 |
| 1163 | 0.00006 |
| 1164 | −0.00051 |
| 1165 | −0.00015 |
| 1166 | 0.00063 |
| 1167 | 0.00048 |
| 1168 | 0.00007 |
| 1169 | 0.00021 |
| 1170 | 0 |
| 1171 | −0.00028 |
| 1172 | 0.00047 |
| 1173 | 0.00075 |
| 1174 | −0.0004 |
| 1175 | 0.00072 |
| 1176 | −0.00021 |
| 1177 | 0.00066 |
| 1178 | −0.00015 |
| 1179 | 0.0005 |
| 1180 | 0 |
| 1181 | −0.00041 |
| 1182 | 0.00005 |
| 1183 | 0.00014 |
| 1184 | −0.00044 |
| 1185 | 0.00022 |
| 1186 | −0.00009 |
| 1187 | 0.00025 |
| 1188 | −0.00058 |
| 1189 | 0.00001 |
| 1190 | 0 |
| 1191 | −0.00009 |
| 1192 | 0.00045 |
| 1193 | −0.00043 |
| 1194 | 0.00006 |
| 1195 | −0.00036 |
| 1196 | 0.00038 |
| 1197 | 0.00007 |
| 1198 | 0.00046 |
| 1199 | 0.00055 |
| 1200 | 0 |
| 1201 | −0.00014 |
| 1202 | 0.0001 |
| 1203 | −0.00013 |
| 1204 | −0.00061 |
| 1205 | −0.00011 |
| 1206 | −0.00018 |
| 1207 | −0.00064 |
| 1208 | −0.00039 |
| 1209 | 0.00018 |
| 1210 | 0 |
| 1211 | 0.00037 |
| 1212 | −0.00021 |
| 1213 | −0.00006 |
| 1214 | −0.00022 |
| 1215 | 0.00019 |
| 1216 | −0.00076 |
| 1217 | 0.00019 |
| 1218 | −0.00013 |
| 1219 | 0.0001 |
| 1220 | 0 |
| 1221 | −0.00012 |
| 1222 | −0.00026 |
| 1223 | −0.00009 |
| 1224 | −0.00028 |
| 1225 | −0.00035 |
| 1226 | 0.00055 |
| 1227 | 0.00036 |
| 1228 | −0.00036 |
| 1229 | −0.00033 |
| 1230 | 0 |
| 1231 | −0.00058 |
| 1232 | −0.00018 |
| 1233 | 0.00023 |
| 1234 | −0.00065 |
| 1235 | −0.00036 |
| 1236 | −0.00056 |
| 1237 | 0.00033 |
| 1238 | 0.00022 |
| 1239 | −0.00044 |
| 1240 | 0 |
| 1241 | 0.00004 |
| 1242 | −0.00002 |
| 1243 | 0.00032 |
| 1244 | 0.00072 |
| 1245 | 0.0002 |
| 1246 | −0.00011 |
| 1247 | −0.00005 |
| 1248 | 0.00019 |
| 1249 | −0.00015 |
| 1250 | 0 |
| 1251 | −0.00064 |
| 1252 | −0.00005 |
| 1253 | 0.00046 |
| 1254 | 0.00075 |
| 1255 | −0.00038 |
| 1256 | 0.00005 |
| 1257 | −0.00037 |
| 1258 | 0.00052 |
| 1259 | −0.00052 |
| 1260 | 0 |

After the master was rough cut as previously described, the grooves were fine cut in alternating directions in the same manner as Comparative A. For the first set of grooves, the magnitude of the groove spacing variation for each groove corresponded to the random number indicated in the even columns for index 20 through 743. Hence, the first groove had a groove spacing of 0.003200 inches (0.081280 mm) with a variation of 0, the third groove had a groove spacing of 0.003200 inches (0.081280 mm)−0.00049000 mm=0.003181 inches (0.080797 mm), the fifth groove had a groove spacing of 0.003200 inches (0.081280 mm)+ 0.00004000 mm=0.003202 inches (0.813308 mm), etc. After fine cutting the 743rd groove at the bottom of the plate, the alternating (i.e. skipped even numbered) grooves were finish cut from bottom to top in the same manner using the random number indicated in the even columns of the tables for index 20 through 743. The second and third sets of grooves were cut in the same manner, the magnitude of the groove spacing variation for each groove corresponding to the random number indicated in the even columns for index 21 through 1041.

Figure 3:
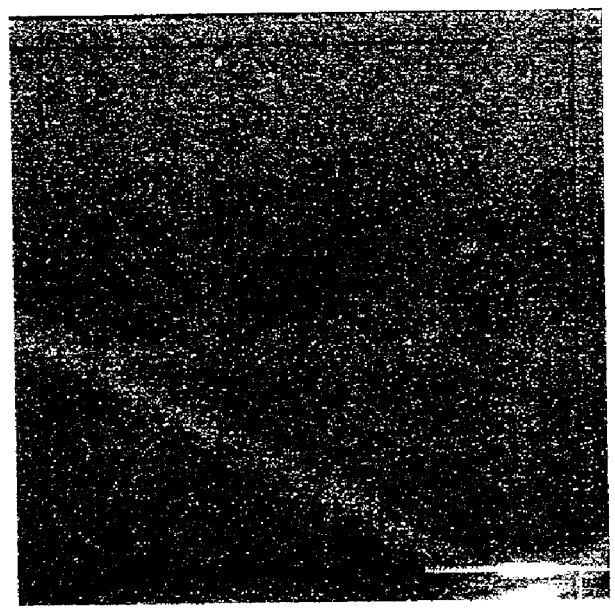
FIG. 3 depicts a photograph of a tooling that was a negative replica of a master wherein the grooves were cut with a precision at least as precise as +/−100 nm and 90% of the groove spacings were randomly varied, the average groove spacing being the same as in FIG. 2 and the magnitude of variation within the range of +/−1/100th of the average groove spacing.

The master was removed from the groove-forming machine. Toolings were made from the master in the same manner as described in Comparative Example A. The negative tool was observed not to have a moiré-like pattern, as depicted by FIG. 3. Cube-corner sheeting was then prepared from the toolings in the same manner as described in Comparative Example A. The resulting sheeting was then evaluated in the same manner as described in Comparative Example A. The coefficient of retroreflection, $R_A$, was measured as recommended by CIE publication No. 54 at −4° entrance, 0° orientation, 0.2° observation. The average of 9 spot readings over the entire area of the sample was 995 candles per lux per square meter with a standard deviation of 7 candles per lux per square meter. The difference in $R_A$ in comparison to Comparative Example A is due in part to the moiré-like pattern interfering with the retroreflection and in part to the cubes of Comparative Example A having a different average groove spacing. The relatively large standard deviation of Comparative Example A in comparison to Example 1 is surmised to be caused by the moiré-like pattern interfering with the ability to measure the retroreflection.

Example 2

The cube-corner surface of the retroreflective sheeting of Example 1 was coated with aluminum by vapor deposition. The resulting retroreflective sheeting was evaluated in the same manner as Comparative Example A. The light that retroreflected from the sheeting was observed not to exhibit the moiré-like pattern. The coefficient of retroreflection, $R_A$, was measured as recommended by CIE publication No. 54 at −4° entrance, 0° orientation, 0.2° observation. The average of 9 spot reading over the entire area of the sample was 1679 candela per lux per square meter with a standard deviation of 7 candles per lux per square meter.

Example 3

A master was made in the same manner as described in Example 1. A positive copy tooling was used to form sheeting in the same manner described in Comparative Example A. The cube-corner structured surface of this negative copy was coated with aluminum by vapor deposition in the same manner as described in Comparative Example B. The resulting retroreflective sheeting was evaluated in the same manner as Comparative Example A. The light that retroreflected from the sheeting was observed not to exhibit the moiré-like pattern. The coefficient of retroreflection, $R_A$, was measured as recommended by CIE publication No. 54 at −4° entrance, 0° orientation, 0.2° observation. The average of 9 spot readings over the entire area of the sample was 2075 candela per lux per square meter with a standard deviation of 11 candles per lux per square meter.

What is claimed is:

1. A method of making a master for producing retroreflective sheeting substantially free of a reflected moiré-like pattern by forming three sets of V-shaped grooves in a substrate such that the intersections form an array of cube-corner elements; wherein the grooves in each set are formed at a position having an average groove spacing ranging from 0.0005 inches (0.0127 mm) to 0.0070 inches (0.1778 mm) and the grooves are formed such that the groove position of at least every 10th groove in at least one set is varied from an adjacent parallel groove by a magnitude ranging from about 15 nm to about 1/10th of the average groove spacing.

2. The method of claim 1 wherein the magnitude is less than 1/15th of the average groove spacing.

3. The method of claim 1 wherein the magnitude is less than 1/20th of the average groove spacing.

4. The method of claim 1 wherein the magnitude is less than 1/50th of the average groove spacing.

5. The method of claim 1 wherein the magnitude is less than 1/75th of the average groove spacing.

6. The method of claim 1 wherein the magnitude is about 1/100th or less of the average groove spacing.

7. The method of claim 1 wherein the grooves arc formed with a groove position precision that is at least as precise as +/−10 nm for a distance of 10 consecutive grooves.

8. The method of claim 1 wherein the magnitude of groove position variation is at least 200 nm.

9. The method of claim 8 wherein the grooves are formed with a groove position precision that is at least as precise as +/−100 nm.

10. The method of claim 1 wherein the magnitude of groove position variation is at least 400 nm.

11. The method of claim 10 wherein the grooves are formed with a groove position precision that is at least as precise as +/−200 nm.

12. A method of making a master for producing retroflective sheeting free of a moiré-like pattern by forming three sets of V-shaped grooves in a substrate much that the intersections form an array of cube-corner elements; wherein the grooves in each set are formed with a groove position precision ranging front about +/−10 nm to about +/−500 nm for a distance of 10 consecutive grooves and the groove position of at least every 10th groove in at least one of the three sets is varied from an adjacent parallel groove by a magnitude ranging from about 15 nm to about 1/10th of the average groove spacing.

13. The method of claim 12 wherein the magnitude is less than 1/15th of the average groove spacing.

14. The method of claim 12 wherein the magnitude is less than 1/20th of the average groove spacing.

15. The method of claim 12 wherein the magnitude is less than 1/30th of the average groove spacing.

16. The method of claim 12 wherein the magnitude Is less than 1/17th of the average groove spacing.

17. The method of claim 12 wherein the magnitude is about 1/100th or less of the average groove spacing.

18. The method of claim 12 wherein the magnitude of groove position variation is at least 200 nm.

19. The method of claim 12 wherein the magnitude of groove position variation is at least 400 nm.

20. The method of claim 1 wherein at least every 7th groove position is varied.

21. The method of claim 1 wherein at least every 5th groove position is varied.

22. The method of claim 1 wherein at least every 3rd groove position is varied.

23. The method of claim 1 wherein substantially all the groove positions are varied.

24. The method of claim 20 wherein at least two sets are varied.

25. The method of claim 21 wherein at least two sets are varied.

26. The method of claim 22 wherein at least two sets are varied.

27. The method of claim 23 wherein at least two sets are varied.

28. The method of claim 20 wherein each of the three sets are varied.

29. The method of claim 21 wherein each of the three sets are varied.

30. The method of claim 22 wherein each of the three sets are varied.

31. The method of claim 23 wherein each of the three sets are varied.

32. The method of claim 1 wherein the magnitude is generated by a random or pseudo-random process.

33. The method of claim 1 wherein the varied groove position has a constant groove depth and varied groove spacing.

34. The method of claim 1 wherein the varied groove position has a constant groove spacing and varied groove depth.

35. The method of claim 1 wherein the varied groove position has varied groove spacing and varied groove depth.

36. The method of claim 1 wherein the cube-corner elements are uncanted.

37. The method of claim 1 wherein at least a portion of the cube-corner elements are canted.

38. The method of claim 1 wherein the grooves are formed with a groove angle precision that is at least as precise as +/−2 arc minutes.

39. The method of claim 1 wherein the grooves are formed with a groove angle position that is at least as precise as +/−1 arc minute.

40. The method of claim 1 wherein the grooves are formed with a groove angle precision that is at least as precise as +/−½arc minute.

41. The method of claim 1 wherein the master is retroreflective.

42. The method of claim 41 wherein light reflected from the master is substantially free of a moiré-like pattern.

43. A method of making a tooling comprising providing a muster according to claim 1;

electroplating the master forming a negative tooling;

removing the tooling from the master; and optionally electroplating the negative tooling at least once forming at least one positive tooling;

optionally electroplating the positive or negative tooling forming a multigenerational tooling.

44. A method of making a retroreflective sheeting comprising providing a tooling having a microprismatic surface according to claim 43;

casting a fluid rosin composition on the microprismatic surface of the tooling;

allowing the composition to harden forming a sheet; and removing the tooling.

45. The method of claim 44 wherein the resin composition is transparent.

46. The method of claim 44 wherein the resin composition is polycarbonate.

47. A method of making a retroreflective sheeting comprising providing a tooling having a microprismatic surface according to claim 44;

providing a moldable substrate;

contacting the microprismatic surface of the tooling to the substrate such that a replica of the microprismatic surface is imparted on the substrate; and removing the tooling.

48. The method of claim 47 wherein the moldable substrate is transparent.

49. The method of claim 48 wherein the moldable substrate is polycarbonate.

50. The method of claim 44 further comprising applying a reflective coating to the substrate.

51. Retroreflective sheeting comprising a polymeric sheet having an array of cube-corner elements, the elements formed from three sets of parallel intersecting V-shaped grooves, wherein the grooves in each set are formed at a position having an average groove spacing ranging from 0.0005 inches (0.0127 mm) to 0.007 inches (0.1778 mm) and the groove position of at least every 10th groove in at least one of the three sets differs from an adjacent parallel groove by a magnitude ranging from about 50 nm to about 1/10th of the average groove spacing.

52. The retroreflective sheeting of claim 51 wherein the magnitude is learn than 1/15th of the average groove spacing.

53. The retroreflective sheeting of claim 51 wherein the magnitude is less than 1/20th of the average groove spacing.

54. The retroreflective sheeting of claim 51 wherein the magnitude is less than 1/50th of the average groove spacing.

55. The retroreflective sheeting of claim 51 wherein the magnitude is less than 1/75th of the average groove spacing.

56. The retroreflective sheeting of claim 51 wherein magnitude is about 1/100th or less of the average groove spacing.

57. The retrorefloctive sheeting of claim 51 wherein the magnitude of groove position variation is at least 200 nm.

58. The retroreflective sheeting of claim 51 wherein the magnitude of groove position variation is at least 400 nm.

59. The retroreflective sheeting of claim 51 wherein at least every 7th groove position is varied.

60. The retroreflective sheeting of claim 51 wherein at least every 5th groove position is varied.

61. The retroreflective sheeting of claim 51 wherein at least every 3rd groove position is varied.

62. The retroreflective sheeting of claim 51 wherein substantially all the groove positions are varied.

63. The retrorofloctive sheeting of claim 51 wherein the groove position has a constant groove depth and differs in groove spacing.

64. The retroreflective sheeting of claim 51 wherein the groove position has a constant groove spacing and differs in groove depth.

65. The retrorofloctive sheeting of claim 51 wherein the groove position differs in groove spacing and differs in groove depth.

66. The retroreflective sheeting of claim 51 wherein the cube-corner elements are uncanted.

67. The retroreflective sheeting of claim 51 wherein at least a portion of the cube-corner elements are canted.

68. The retroreflective sheeting of claim 51 wherein the sheeting is substantially free of a moiré-like pattern.

* * * * *

UNITED STATES PATENT AND TRADEMARK OFFICE
CERTIFICATE OF CORRECTION

PATENT NO.    : 6,843,571 B2
DATED         : January 18, 2005
INVENTOR(S)   : Sewall, Nelson D.

It is certified that error appears in the above-identified patent and that said Letters Patent is hereby corrected as shown below:

Column 12,
Lines 52, 53 and 67, delete "candles" and insert -- candelas --, therefor.

Column 13,
Line 16, delete "candles" and insert -- candelas --, therefor.

Column 30,
Line 67, delete "candles" and insert -- candelas --, therefor.

Column 31,
Lines 1, 22 and 39, delete "candles" and insert -- candelas --, therefor.
Line 63, delete "arc" and insert -- are --, therefor.

Column 32,
Line 11, delete "much" and insert -- such --, therefor.
Line 14, delete "front" and insert -- from --, therefor.
Line 25, delete "1/30th" and insert -- 1/50th --, therefor.
Line 26, delete "Is" and insert -- is --, therefor.
Line 27, delete "1/17th" and insert -- 1/75th --, therefor.

Column 33,
Line 9, delete "position" and insert -- precision --, therefor.
Lines 14-15, delete "retroroflective" and insert -- retroreflective --, therefor.
Line 19, delete "muster" and insert -- master --, therefor.
Line 30, delete "rosin" and insert -- resin --, therefor.

UNITED STATES PATENT AND TRADEMARK OFFICE
CERTIFICATE OF CORRECTION

PATENT NO.    : 6,843,571 B2
DATED         : January 18, 2005
INVENTOR(S)   : Sewall, Nelson D.

It is certified that error appears in the above-identified patent and that said Letters Patent is hereby corrected as shown below:

<u>Column 34,</u>
Line 13, delete "learn" and insert -- less --, therefor.
Line 23, delete "retrorefloctive" and insert -- retroreflective --, therefor.
Lines 35 and 42, delete "retroroflective" and insert -- retroreflective --, therefor.

Signed and Sealed this

Twelfth Day of April, 2005

JON W. DUDAS
*Director of the United States Patent and Trademark Office*